(12) United States Patent
Wang et al.

(10) Patent No.: US 8,930,529 B1
(45) Date of Patent: Jan. 6, 2015

(54) POLICY ENFORCEMENT WITH DYNAMIC ADDRESS OBJECT

(75) Inventors: Song Wang, Palo Alto, CA (US);
Suiqiang Deng, Fremont, CA (US);
Wilson Xu, San Jose, CA (US); Martin Walter, Mountain View, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 116 days.

(21) Appl. No.: 13/246,472

(22) Filed: Sep. 27, 2011

(51) Int. Cl.
*G06F 15/173* (2006.01)

(52) U.S. Cl.
USPC ............................................. 709/224; 718/1

(58) Field of Classification Search
USPC ............... 709/224–229, 238; 718/1; 711/162; 726/14
See application file for complete search history.

(56) References Cited

U.S. PATENT DOCUMENTS

| | | | |
|---|---|---|---|
| 6,484,261 B1 | 11/2002 | Wiegel | |
| 6,785,728 B1 | 8/2004 | Schneider et al. | |
| 7,194,529 B2 * | 3/2007 | Kupiec et al. | 709/223 |
| 7,900,005 B2 * | 3/2011 | Kotsovinos et al. | 711/162 |
| 8,185,573 B2 * | 5/2012 | Izdepski et al. | 709/203 |
| 8,224,918 B2 * | 7/2012 | McCarthy et al. | 709/206 |
| 8,341,732 B2 | 12/2012 | Croft et al. | |
| 8,385,519 B2 * | 2/2013 | Lindblad et al. | 379/93.01 |
| 8,413,147 B2 * | 4/2013 | Shen et al. | 718/1 |
| 8,566,900 B1 | 10/2013 | Bharali et al. | |
| 8,775,625 B2 * | 7/2014 | Narayanaswamy et al. | 709/226 |
| 2003/0097589 A1 * | 5/2003 | Syvanne | 713/201 |
| 2003/0149781 A1 * | 8/2003 | Yared et al. | 709/229 |
| 2007/0005801 A1 * | 1/2007 | Kumar et al. | 709/238 |
| 2009/0249438 A1 | 10/2009 | Litvin et al. | |
| 2009/0249472 A1 * | 10/2009 | Litvin et al. | 726/14 |
| 2010/0287548 A1 * | 11/2010 | Zhou et al. | 718/1 |
| 2012/0030751 A1 | 2/2012 | Datta et al. | |
| 2012/0173757 A1 * | 7/2012 | Sanden | 709/238 |
| 2012/0174186 A1 | 7/2012 | Aziz et al. | |
| 2012/0311568 A1 * | 12/2012 | Jansen | 718/1 |
| 2012/0311575 A1 | 12/2012 | Song | |
| 2012/0317610 A1 | 12/2012 | Kashyap | |
| 2013/0031544 A1 | 1/2013 | Sridharan et al. | |
| 2013/0198808 A1 | 8/2013 | Thomson et al. | |

* cited by examiner

*Primary Examiner* — Dustin Nguyen (74) *Attorney, Agent, or Firm* — Van Pelt, Yi & James LLP (57) ABSTRACT

Policy enforcement is disclosed. An identity notification is received from a network device. The identity notification is usable to determine a user identifier associated with the network device. The identity notification is also usable to determine an IP address associated with the network device. A policy is updated based on the received identity notification.

14 Claims, 7 Drawing Sheets

| Source Zone | Source User | Dest. Zone | Dest. User | Application | Action |
|---|---|---|---|---|---|
| Internet | * | ACMEHost | ACME-VM-1 | HTTPS | ALLOW |
| Enterprise | Engineering | ACMEHost | ACME-VM-4 | SSH | ALLOW |

302 → Source Zone; 304 → Enterprise row; 306 → Dest. User header; 308 → ACME-VM-4

FIG. 3A

| Source Zone | Source User | Dest. Zone | Dest. User | Application | Action |
|---|---|---|---|---|---|
| Internet | * | ACMEHost | 10.0.0.1 | HTTPS | ALLOW |
| Enterprise | Engineering | ACMEHost | 172.16.0.1 | SSH | ALLOW |

| Source Zone | Source User | Dest. Zone | Dest. User | Application | Action |
|---|---|---|---|---|---|
| Internet | * | ACMEHost | 172.16.0.4 | HTTPS | ALLOW |
| Enterprise | Engineering | ACMEHost | 172.16.0.1 | SSH | ALLOW |

```
<uid-message>
    <version>1.0</version>
    <type>update</type>
    <payload>                                    ┌502          ┌504
        <register>
            <entry identifier="ACME-VM-1" IP="172.16.0.4"/>
        </register>
    </payload>
</uid-message>
```

FIG. 7

POLICY ENFORCEMENT WITH DYNAMIC ADDRESS OBJECT

BACKGROUND OF THE INVENTION

Devices such as firewalls are sometimes used to prevent individuals from accessing resources to which they are not authorized. As an example, members of the public may be entitled to access content served by a web server, but not authorized to access other services available on the server such as administrative tools. A firewall can enforce such policies, such as through a set of rules that include static information about the server such as an IP address.

Increasingly, businesses and other entities are using hosted computing resources instead of purchasing and maintaining computer hardware themselves. As one example, instead of maintaining a set of dedicated physical machines (e.g., to serve web pages), businesses run virtual machines on leased hardware. In such a scenario, if a particular physical machine fails, the virtual machine image(s) running on that physical machine can be migrated to a new physical machine. Unfortunately, the dynamic nature of virtual machine migration can pose problems for firewall rules which traditionally expect servers to be configured with static IP addresses.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
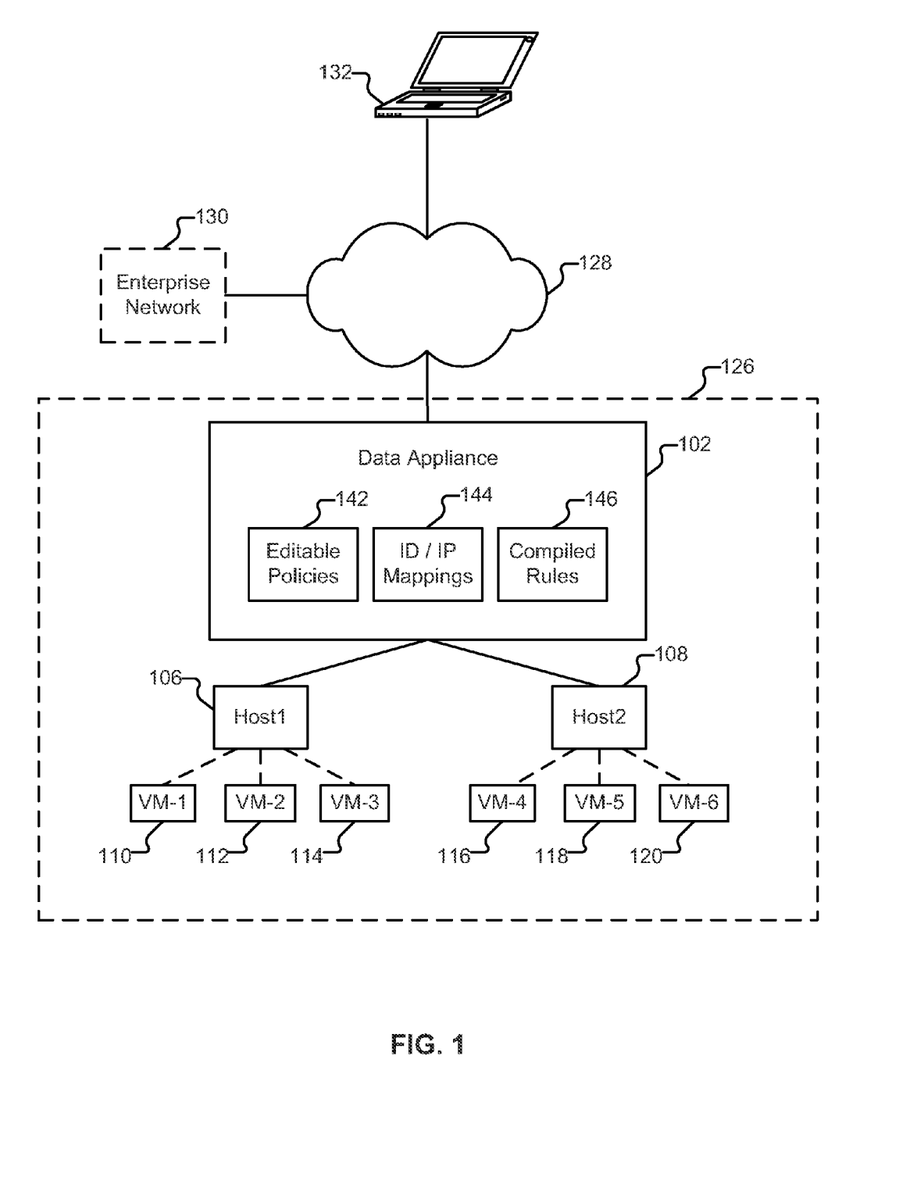
FIG. 1 illustrates an embodiment of an environment in which policies that include devices with dynamic addresses are enforced.

FIG. 1 illustrates an embodiment of an environment in which policies that include devices with dynamic addresses are enforced. As illustrated in FIG. 1, a company (referred to herein as "ExampleCo") maintains an enterprise network 130 and also has a set of virtual servers (also referred to as "virtual machines") that are hosted by a hosting provider (referred to herein as "ACME Hosting"), in a data center 126. In the example shown, ExampleCo has a total of six virtual servers (110-120) running on a total of two hosts (106-108) provided by ACME Hosting.

Communications between ExampleCo's virtual servers 110-120 and resources outside of ACME Hosting's data center (e.g., communications from laptop 132 via network 128) pass through data appliance 102 placed at the perimeter of data center 126. Such communications may take place using any appropriate communication protocol such as Hypertext Transfer Protocol (HTTP), Secure Sockets Layer (SSL), and File Transfer Protocol (FTP). In the example shown in FIG. 1, data appliance 102 is a firewall and is configured to enforce policies (also referred to herein as "rules") with respect to the communications it receives. Other types of devices can also be configured to provide the functionality described herein as being performed by data appliance 102. For example, a router, gateway, intrusion detection system, intrusion prevention system, or other appropriate device can be configured to perform either or both of the identity management functionality and policy enforcement functionality. In some embodiments, data appliance 102 is also configured to enforce policies with respect to traffic that stays within ACME's data center 126.

As explained above, data appliance 102 is configured to enforce various policies. Such policies can apply to particular devices (e.g., virtual server 110), particular users, and/or groups (e.g., of devices or users). As one example, a policy can specify that access to virtual server 110 via HTTPS is permitted by anyone (including an arbitrary member of the public using laptop 132). As another example, a policy can specify that access to virtual server 116 via SSH is permitted by members of the Engineering group, and denied to anyone else. Other types of actions can also be specified, such as policies requiring that certain types of access be logged. Other types of policies can also be specified, as applicable, such as quality of service policies, instead of or in addition to access/security policies.

Figure 2:
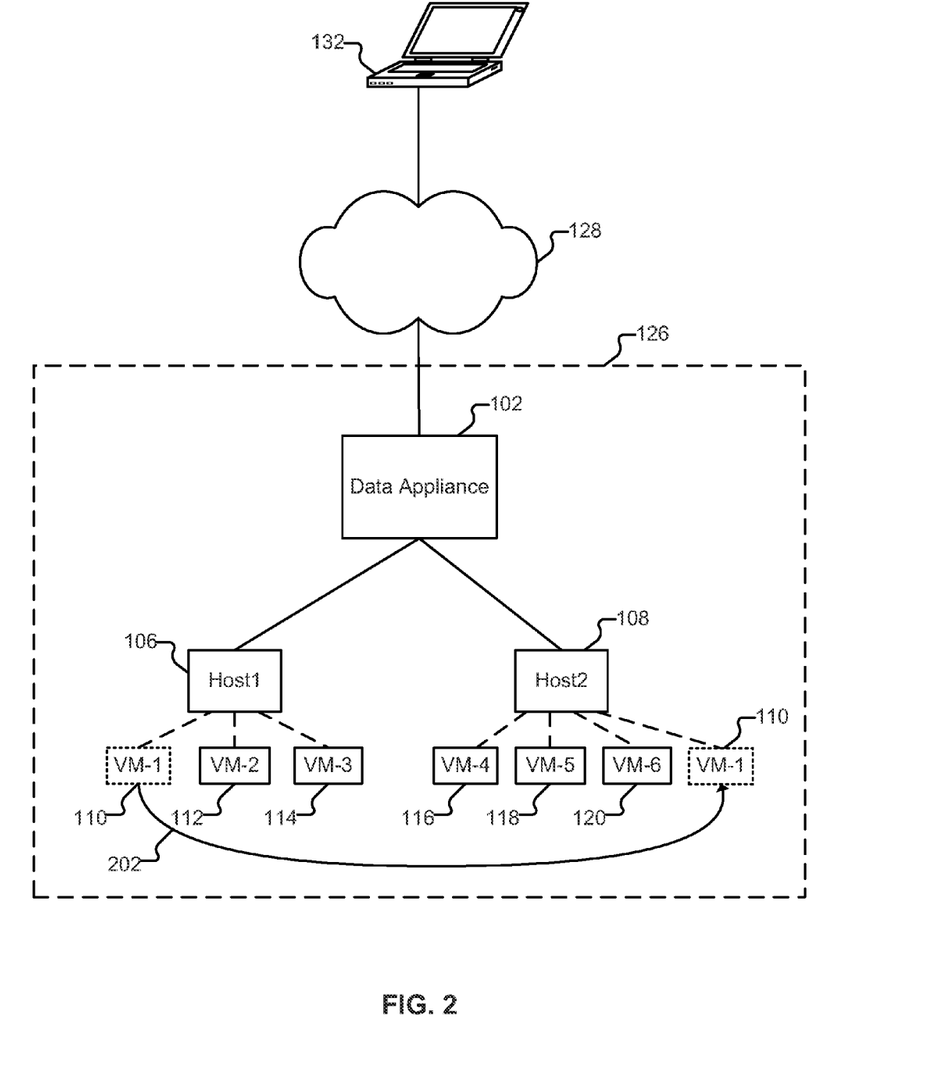
FIG. 2 illustrates an example of a migration of a virtual machine.

FIG. 2 illustrates an example of a migration of a virtual machine. As shown, virtual machine 110, which is illustrated in FIG. 1 as being hosted by host 106, is migrated to host 108 as indicated by line 202. One reason for the migration is if host 106 has a hardware or other failure. Host 108 is located in a different network segment from host 106 and the IP address of virtual machine 110 will change as a result of the migration.

Figure 3A:
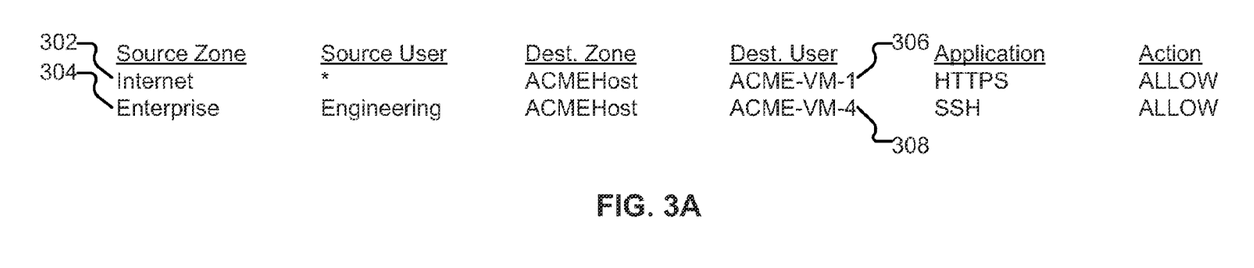
FIG. 3A illustrates an example of a set of policies.

FIG. 3A illustrates an example of a set of policies. Policy 302 states that any user whose traffic originates from the Internet (e.g., a user of client 132) is permitted to access virtual machine 110 using HTTPS. Policy 304 states that members of the Engineering group at ExampleCo are permitted to access virtual machine 116 using SSH, using computers located within enterprise network 130. The policies shown in FIG. 3A are stored (142) on data appliance 102 and are editable by an administrator (e.g., of data appliance 102). As shown, the administrator uses a unique identifier (306, 308) to refer to a particular device (e.g., virtual machine 110 and virtual machine 116, respectively). The unique identifier can correspond to an existing identifier of the device (e.g., a unique machine name) or can be an arbitrary unique string (e.g., generated by data appliance 102 as part of an initialization) that is mappable to the device. The administrator does not need to provide the IP addresses of the machines when creating (or editing) the rules shown in FIG. 3A.

Also stored by data appliance 102 is a repository of mappings (144) between the unique device identifiers and the IP address of the devices. The mappings can be stored in a variety of forms, such as in a database or as a set of one or more flat files. One example of a mapping is: "ACME-VM-1::10.0.0.1" indicating that the IP address of the device having a unique identifier of "ACME-VM-1" (i.e., virtual machine 110) is "10.0.0.1." Other information can also be included in the mapping as applicable, such as a timestamp at which the mapping was added (or updated). As will be described in more detail below, when the IP address of a particular device changes, the mapping in the repository is updated and any firewall rules involving the particular device are updated as well.

Figure 3B:
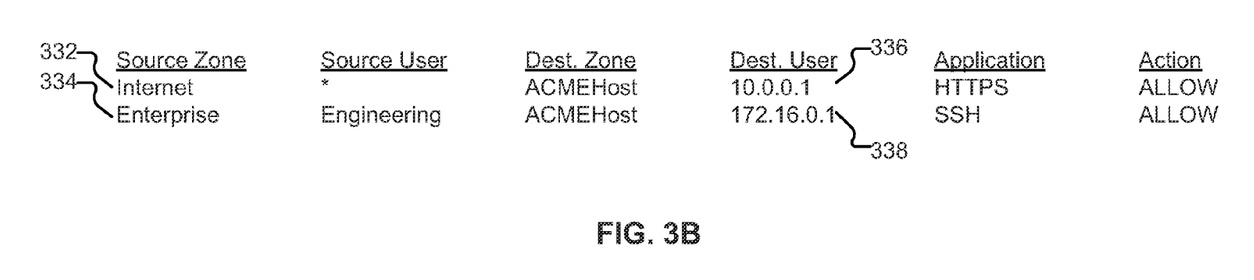
FIG. 3B illustrates a conceptualized set of compiled rules.

FIG. 3B illustrates a conceptualized set of compiled rules. Policies (e.g., depicted in FIG. 3A) are compiled (146) and, at runtime, used in enforcement by data appliance 102. Specifically, during compilation, unique identifiers 306 and 308 are replaced with their corresponding mapped IP addresses as fetched from repository 144 (336, 338).

Figure 3C:
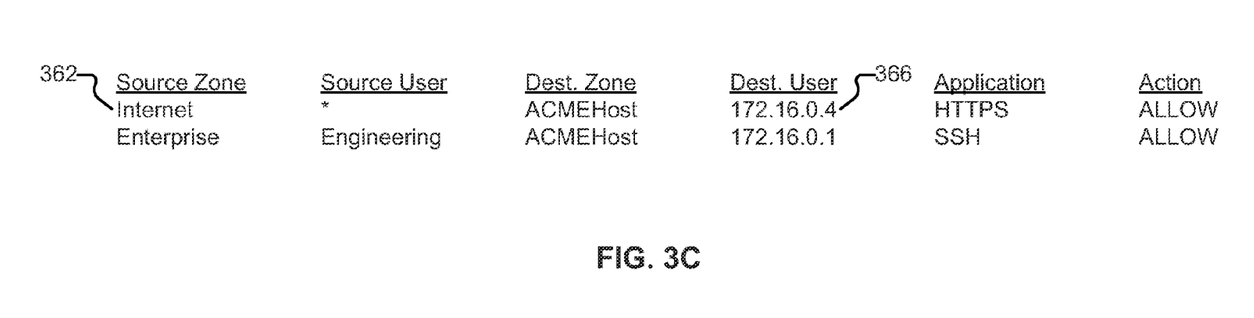
FIG. 3C illustrates a conceptualized set of compiled rules.

FIG. 3C illustrates a conceptualized set of compiled rules. The rules shown in FIG. 3B correspond to virtual machines 110 and 116 as they appear in the network topology depicted in FIG. 1 (i.e., before virtual machine 110 migrates). When virtual machine 110 migrates (202), its IP address changes from 10.0.0.1 to 172.16.0.4. As will be described in more detail below, the updated IP address is propagated to data appliance 102, which updates the ID-to-IP address mapping stored in repository 114 and also recompiles rule 302. Shown in FIG. 3C are rules 302 and 304 as recompiled after virtual machine 110 is migrated. Specifically, IP address 336 has been changed (366) to reflect the current IP address of virtual machine 110 after migration.

Figure 4:
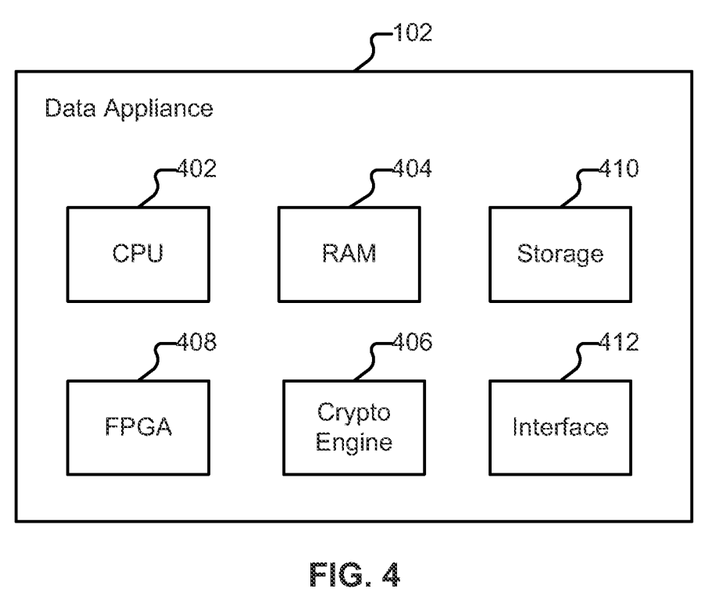
FIG. 4 illustrates an embodiment of a data appliance.

FIG. 4 illustrates an embodiment of a data appliance. The example shown is a representation of physical components that can be included in data appliance 102. Specifically, data appliance 102 includes a high performance multi-core CPU 402 and RAM 404. Data appliance 102 also includes a storage 410 (such as one or more hard disks), which is used to store policy and other configuration information. Data appliance 102 can also include one or more optional hardware accelerators. For example, data appliance 102 can include a cryptographic engine 406 configured to perform encryption and decryption operations, and one or more FPGAs 408 configured to perform signature matching, act as network processors, and/or perform other tasks. Also included in data appliance 102 is interface 412. As shown, interface 412 exposes an application programming interface (API) via which devices, such as virtual machine 110, keep data appliance 102 apprised of their current IP addresses.

Figure 5:
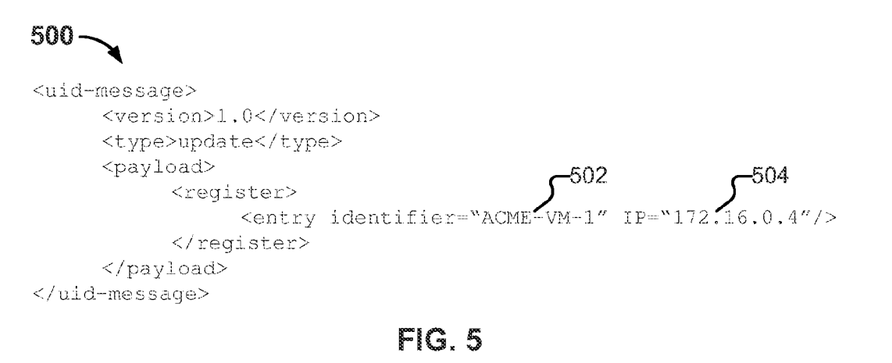
FIG. 5 illustrates an example of an XML document.

FIG. 5 illustrates an example of an XML document. In the example shown, the document includes a unique identifier of the device (502) and the current IP address of the device (504). In some embodiments, a document such as document 500 is sent by a device, such as virtual machine 110, to data appliance 102 via an API exposed by interface 412. The document can be sent in response to a variety of triggering events taking place, and can also be sent periodically. For example, virtual machine 110 can be configured to execute a startup script each time the virtual machine is started, that sends document 500 (with the appropriate IP address) to data appliance 102. As another example, virtual machine 110 (or another entity, such as host 108) can be configured to send document 500 in conjunction with the migration of virtual machine 110 from host 106 to 108. As yet another example, virtual machine 110 can be configured to transmit document 500 to data appliance 102 once an hour.

Other events can also be used to trigger the sending of document 500 to data appliance 102. For example, suppose virtual machine 118 is a virtualized desktop computer assigned to a member of the engineering group at ExampleCo. Each time the employee logs into virtual machine 118, a script executes that sends document 500 to data appliance 102.

Figure 6:
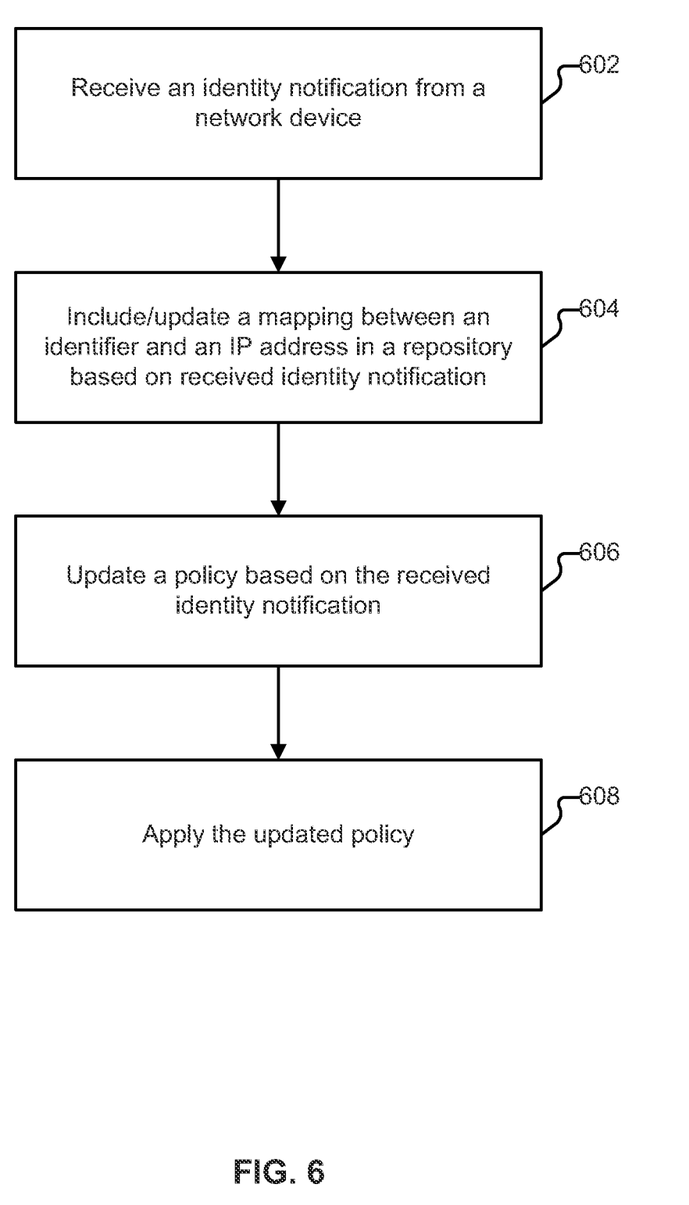
FIG. 6 illustrates an example of a process for updating and enforcing a policy.

FIG. 6 illustrates an example of a process for updating and enforcing a policy. In some embodiments the process shown in FIG. 6 is performed by data appliance 102. The process begins at 602 when an identity notification is received from a network device. The identity notification can take a variety of forms. As one example, when virtual machine 110 sends document 500 to data appliance 102, data appliance 102 receives that information (as an identity notification) at 602. As another example, virtual machine 110 can be configured to send just its identifier (e.g., in a document similar to the one shown in FIG. 5, or in any other appropriate format), without explicitly specifying its IP address. In such a scenario, data appliance 102 can infer the IP address of virtual machine 110 from the packet(s) in which the identifier is encapsulated. As yet another example, virtual machine 110 can send a digital certificate or other data usable by data appliance 102 to determine identifier 502 without virtual machine 110 explicitly providing identifier 502 in an XML document or other applicable message.

At 604, data appliance 102 stores identifier 502 and IP address 504 in repository 144. As will be described in more detail below, in some embodiments the identity notification is received indirectly from the network device by data appliance 102, such as by an agent working in cooperation with the data appliance and/or device 110.

At 606, a policy is updated based on the received identity notification. As one example, at 606, the previously compiled version of policy 302 (332) is recompiled (362) using the updated IP address 366. In various embodiments, the identity notification is a push-type notification, and the receipt of a notification at 602 automatically triggers recompilation at 606 of any rules implicated by the received notification.

Finally, at 608, the updated policy is applied. As one example, when virtual machine 110 is migrated from host 106 to 108, users, such as a user of client 132, will be permitted to access virtual machine 110 via HTTPS at its new IP address.

Figure 7:
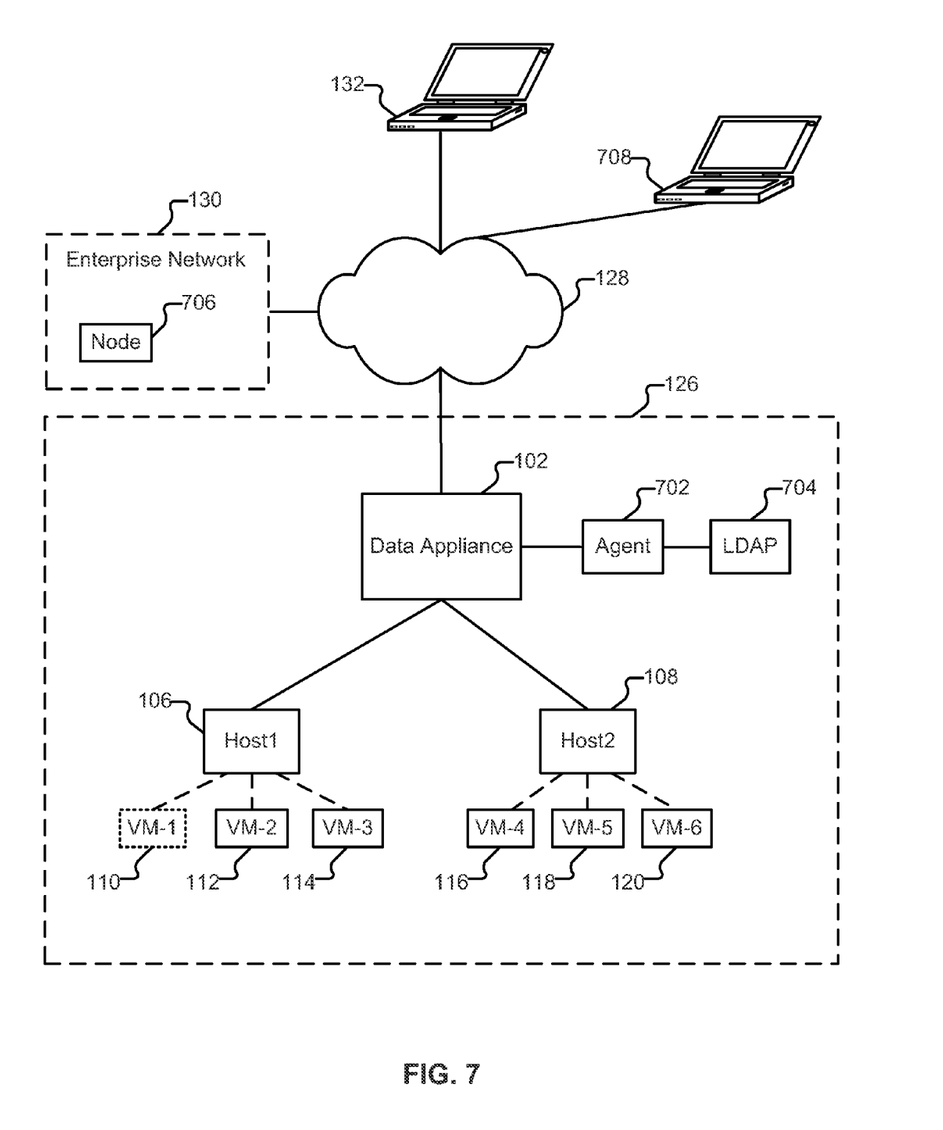
FIG. 7 illustrates an embodiment of an environment in which policies that include devices with dynamic addresses are enforced.

FIG. 7 illustrates an embodiment of an environment in which policies that include devices with dynamic addresses are enforced. In the example shown in FIG. 7, data appliance 102 is in communication with an agent 702 and a virtualized directory service provider 704. Directory service provider 704 (also referred to as a domain controller) makes use of the Lightweight Directory Access Protocol (LDAP) or other appropriate protocols. In some embodiments, when a device is first added to enterprise network 130 (and/or data center 126 on behalf of ExampleCo), an entry for the device is included in directory service provider 704. The unique identifier for the device as it appears in directory service provider 704 is also usable as identifier 502. One example of a directory service provider 704 is a Microsoft Active Directory server. Other types of systems can also be used instead of directory service provider 704, such as a Kerberos-based system, and the techniques described herein adapted accordingly. Agent 702 can be collocated on data appliance 102, collocated on directory service provider 704, or provided by a separate component (as shown in FIG. 7).

When components such as agent 702 and directory service provider 704 are included in an environment, portions of the functionality provided by data appliance 102 can be replicated by the agent and/or directory service provider or may be provided by those components instead of being provided by data appliance 102. As one example, directory service provider 704 can be configured to provide API 412, with devices such as virtual machine 110 sending identity notifications to the directory service provider 704 instead of to data appliance 102. Similarly, directory service provider 704 can be configured to store repository 144 instead of the ID-to-IP address mappings being stored by data appliance 102. In such scenarios, data appliance 102 is configured to cooperate with directory service provider 704 (e.g., via agent 702) as needed to update and enforce policies when IP addresses of devices change.

Also included in the environment shown in FIG. 7 are two additional network devices—node 706 (a computer within enterprise network 130) and node 708 (a computer outside of network 130 and data center 126). Either, or both of nodes 706 and 708 may be configured to use dynamic IP addresses, and can have pertinent policies included in data appliance 102 in accordance with the techniques described herein. For example, node 706 can be configured to execute a script at startup that sends a document similar to document 500 to data appliance 102 (or agent 702 or directory service provider 704 as applicable).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a policy comprising an identifier associated with a network device;
receive a first identity notification from the network device;
store, in response to receiving the first identity notification, a mapping between the identifier associated with the network device and a first IP address determined based at least in part on the first identity notification;
implement the policy based at least in part on the stored mapping, including by using the first IP address to represent the network device;
receive a second identity notification from the network device;
determine, in response to receiving the second identity notification, that an IP address associated with the network device has changed to a second IP address;
update the stored mapping to a mapping between the identifier associated with the network device and the second IP address;
implement a revised version of the policy based at least in part on the updated mapping, including by using the second IP address to represent the network device; and
enforce the implemented revised version of the policy, including by allowing or denying one or more requests to access the network device; and
a memory coupled to the processor and configured to provide the processor with instructions;
wherein the network device comprises a virtual machine, and the second identity notification is received from the virtual machine in conjunction with a migration of the virtual machine.

2. The system of claim 1 wherein at least one of the first identity notification and the second identity notification is received from the network device in conjunction with an execution of a startup script by the network device machine.

3. The system of claim 1 wherein an identity notification is received from the network device periodically.

4. The system of claim 1 wherein at least one of the first identity notification and the second identity notification is received from the network device in response to a login event occurring on the network device.

5. The system of claim 1 wherein at least one of the first identity notification and the second identity notification explicitly includes a user identifier.

6. The system of claim 1 wherein at least one of the first identity notification and the second identity notification explicitly includes a current IP address associated with the network device.

7. The system of claim 1 wherein at least one of the first identity notification and the second identity notification includes a digital certificate usable to determine a user identifier.

8. The system of claim 1 wherein implementing the revised version of the policy includes retrieving the stored mapping between the identifier associated with the network device and the first IP address.

9. The system of claim 1 wherein implementing the revised version of the policy includes compiling a current IP address associated with the network device into a rule usable by a firewall.

10. The system of claim 1 wherein at least one of the first identity notification and the second identity notification is received by the system via an application programming interface.

11. The system of claim 1 wherein the network device is located at a hosting facility.

12. A method, comprising:
receiving a policy comprising an identifier associated with a network device;
receiving a first identity notification from the network device;
storing, in response to receiving the first identity notification, a mapping between the identifier associated with the network device and a first IP address determined based at least in part on the first identity notification;
implementing the policy based at least in part on the stored mapping, including by using the first IP address to represent the network device;
receiving a second identity notification from the network device;
determining, in response to receiving the second identity notification, that an IP address associated with the network device has changed to a second IP address;

updating the stored mapping to a mapping between the identifier associated with the network device and the second IP address;
implementing a revised version of the policy based at least in part on the updated mapping, including by using the second IP address to represent the network device; and
enforcing the implemented revised version of the policy, including by allowing or denying one or more requests to access the network device;
wherein the network device comprises a virtual machine, and the second identity notification is received from the virtual machine in conjunction with a migration of the virtual machine.

13. The method of claim 12 wherein at least one of the first identity notification and the second identity notification is received from the network device in response to a login event occurring on the network device.

14. A computer program product embodied in a non-transitory tangible computer readable storage medium and comprising computer instructions for:
receiving a policy comprising an identifier associated with a network device;
receiving a first identity notification from the network device;
storing, in response to receiving the first identity notification, a mapping between the identifier associated with the network device and a first IP address determined based at least in part on the first identity notification;
implementing the policy based at least in part on the stored mapping, including by using the first IP address to represent the network device;
receiving a second identity notification from the network device;
determining, in response to receiving the second identity notification, that an IP address associated with the network device has changed to a second IP address;
updating the stored mapping to a mapping between the identifier associated with the network device and the second IP address;
implementing a revised version of the policy based at least in part on the updated mapping, including by using the second IP address to represent the network device; and
enforcing the implemented revised version of the policy, including by allowing or denying one or more requests to access the network device;
wherein the network device comprises a virtual machine, and the second identity notification is received from the virtual machine in conjunction with a migration of the virtual machine.

* * * * *

UNITED STATES PATENT AND TRADEMARK OFFICE
CERTIFICATE OF CORRECTION

PATENT NO.      : 8,930,529 B1
APPLICATION NO. : 13/246472
DATED           : January 6, 2015
INVENTOR(S)     : Wang et al.

Page 1 of 1

It is certified that error appears in the above-identified patent and that said Letters Patent is hereby corrected as shown below:

In The Claims

In column 6 Line 19 in Claim 2, delete "machine" after "device".

Signed and Sealed this
Sixteenth Day of August, 2016

Michelle K. Lee
*Director of the United States Patent and Trademark Office*